(12) United States Patent
Ueda (10) Patent No.: US 9,493,034 B1
(45) Date of Patent: Nov. 15, 2016

(54) WHEEL SECURING ASSEMBLY AND BICYCLE WHEEL ASSEMBLY

(71) Applicant: SHIMANO INC., Sakai (JP)

(72) Inventor: Yoshihiro Ueda, Sakai (JP)

(73) Assignee: SHIMANO INC., Sakai (JP)

(*) Notice: Subject to any disclaimer, the term of this patent is extended or adjusted under 35 U.S.C. 154(b) by 0 days.

(21) Appl. No.: 14/735,073

(22) Filed: Jun. 9, 2015

(51) Int. Cl.
*B60B 27/02* (2006.01)
*B62K 25/02* (2006.01)

(52) U.S. Cl.
CPC .............. *B60B 27/026* (2013.01); *B62K 25/02* (2013.01)

(58) Field of Classification Search
CPC .............................. B60B 27/026; B62K 25/02
See application file for complete search history.

(56) References Cited

U.S. PATENT DOCUMENTS

| | | | |
|---|---|---|---|
| 3,807,761 A * | 4/1974 | Brilando | B62K 25/02 280/279 |
| 4,805,941 A * | 2/1989 | Downing | B62K 25/02 280/279 |
| 6,089,675 A * | 7/2000 | Schlanger | B60B 27/023 280/279 |
| 2007/0052285 A1* | 3/2007 | Montague | B62K 25/02 301/124.1 |
| 2015/0069827 A1 | 3/2015 | Nakajima et al. | |

FOREIGN PATENT DOCUMENTS

| | | | | |
|---|---|---|---|---|
| GB | 496106 A | * | 11/1938 | ............ B62K 25/02 |
| WO | WO 9707013 A1 | * | 2/1997 | ............ B62K 25/02 |
| WO | 2008/145497 A1 | | 12/2008 | |

* cited by examiner

*Primary Examiner* — Kip T Kotter
(74) *Attorney, Agent, or Firm* — Mori & Ward, LLP (57) ABSTRACT

A wheel securing assembly comprises a securing axle, a first locking structure, and a second locking structure. The first locking structure includes a first locking member that is configured to apply and release a securing force to and from a bicycle body. The second locking structure includes a second locking member movable relative to a second axle end to be in each of a locking orientation and an unlocking orientation different from the locking orientation. The second locking member includes a receiving surface contactable with the bicycle body to receive the securing force. The receiving surface is positioned relative to the securing axle to face in an axial direction parallel to a center axis in the locking orientation of the second locking member. The receiving surface is configured to face in a direction that is different from the axial direction in the unlocking orientation of the second locking member.

25 Claims, 10 Drawing Sheets

WHEEL SECURING ASSEMBLY AND BICYCLE WHEEL ASSEMBLY

BACKGROUND OF THE INVENTION

Field of the Invention

The present invention relates to a bicycle sprocket and a wheel securing assembly and a bicycle wheel assembly.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a wheel securing assembly of a bicycle wheel assembly.

SUMMARY OF THE INVENTION

In accordance with a first aspect of the present invention, a wheel securing assembly comprises a securing axle, a first locking structure, and a second locking structure. The securing axle includes a center axis, a first axle end, and a second axle end opposite to the first axle end along the center axis. The first locking structure is configured to be provided at the first axle end. The first locking structure includes a first locking member that is configured to apply and release a securing force to and from a bicycle body. The second locking structure is configured to be provided at the second axle end. The second locking structure includes a second locking member movable relative to the second axle end to be in each of a locking orientation and an unlocking orientation different from the locking orientation. The second locking member includes a receiving surface contactable with the bicycle body to receive the securing force. The receiving surface is positioned relative to the securing axle to face in an axial direction parallel to the center axis in the locking orientation of the second locking member. The receiving surface is configured to face in a direction that is different from the axial direction in the unlocking orientation of the second locking member.

With the wheel securing assembly in accordance with the first aspect, the receiving surface is positioned relative to the securing axle to face in an axial direction parallel to the center axis in the locking orientation of the second locking member. The receiving surface is configured to face in a direction that is different from the axial direction in the unlocking orientation of the second locking member. Accordingly, it is possible to easily attach and detach the wheel securing assembly to and from the bicycle body with maintaining the securing function of the wheel securing assembly.

In accordance with a second aspect of the present invention, the wheel securing assembly according to the first aspect is configured so that the first locking member is pivotable relative to the first axle end about a first pivot axis to apply and release the securing force to and from the bicycle body, and the first pivot axis is non-parallel to the center axis.

With the wheel securing assembly in accordance with the second aspect, it is possible to attach and detach the wheel securing assembly to and from the bicycle body in response to a pivotal movement of the first locking member.

In accordance with a third aspect of the present invention, the wheel securing assembly according to the first or second aspect is configured so that the receiving surface is configured to face in a radial direction perpendicular to the center axis in the unlocking orientation of the second locking member.

With the wheel securing assembly in accordance with the third aspect, it is possible to more easily attach and detach the wheel securing assembly to and from the bicycle body.

In accordance with a fourth aspect of the present invention, the wheel securing assembly according to any one of the first to third aspects is configured so that the second locking member is pivotable relative to the securing axle about a second pivot axis to be in each of the locking orientation and the unlocking orientation.

With the wheel securing assembly in accordance with the fourth aspect, it is possible to easily change an orientation of the second locking member between the locking orientation and the unlocking orientation relative to the securing axle using a pivotal movement of the second locking member.

In accordance with a fifth aspect of the present invention, the wheel securing assembly according to the fourth aspect is configured so that the second pivot axis is defined to intersect with the center axis.

With the wheel securing assembly in accordance with the fifth aspect, it is possible to more easily insert the second locking member into an opening of the bicycle body in the unlocking orientation.

In accordance with a sixth aspect of the present invention, the wheel securing assembly according to the fourth or fifth aspect is configured so that the second locking member is configured to be positioned relative to the securing axle at a locking position in the locking orientation. The second locking member is configured to be positioned relative to the securing axle at an unlocking position in the unlocking orientation, the unlocking position being different from the locking position.

In accordance with a seventh aspect of the present invention, the wheel securing assembly according to the sixth aspect is configured so that the second locking member is movable relative to the securing axle between the locking position and an intermediate position with maintaining the locking orientation relative to the securing axle. The intermediate position is different from the locking position and the unlocking position.

In accordance with an eighth aspect of the present invention, the wheel securing assembly according to the seventh aspect is configured so that the second locking member is movable relative to the securing axle in a movement direction between the locking position and the intermediate position with maintaining the locking orientation relative to the securing axle. The movement direction is perpendicular to the second pivot axis.

With the wheel securing assembly in accordance with the eighth aspect, it is possible to make it difficult to unintentionally change the orientation of the second locking member from the locking orientation to the unlocking orientation via the intermediate position. Thus it is possible to restrict the wheel securing assembly from being unintentionally detached from the bicycle body.

In accordance with a ninth aspect of the present invention, the wheel securing assembly according to the eighth aspect is configured so that the second locking member includes a first end and a second end opposite to the first end. A second maximum distance defined between the second pivot axis and the second end in the movement direction is longer than a first maximum distance defined between the second pivot axis and the first end in the movement direction in a state where the second locking member is positioned at the locking position.

With the wheel securing assembly in accordance with the ninth aspect, it is possible to more effectively restrict the wheel securing assembly from being unintentionally detached from the bicycle body.

In accordance with a tenth aspect of the present invention, the wheel securing assembly according to any one of the seventh to ninth aspects is configured so that the second locking member is pivotable relative to the securing axle about the second pivot axis between the intermediate position and the unlocking position with changing an orientation of the second locking member between the locking orientation and the unlocking orientation.

With the wheel securing assembly in accordance with the tenth aspect, it is possible to more effectively restrict the wheel securing assembly from being unintentionally detached from the bicycle body.

In accordance with an eleventh aspect of the present invention, the wheel securing assembly according to any one of the first to tenth aspects is configured so that the second locking structure includes a holding structure configured to hold the second locking member to be in at least one of the locking orientation and the unlocking orientation.

With the wheel securing assembly in accordance with the eleventh aspect, it is possible to make it easier to insert the second locking member into an opening of the bicycle body.

In accordance with a twelfth aspect of the present invention, the wheel securing assembly according to the eleventh aspect is configured so that the holding structure includes a holding member and a biasing element. The holding member is movably mounted to the second axle end along the center axis. The biasing element is configured to bias the holding member toward the second locking member.

With the wheel securing assembly in accordance with the twelfth aspect, it is possible to make it easier to insert the second locking member into an opening of the bicycle body with a simple structure.

In accordance with a thirteenth aspect of the present invention, the wheel securing assembly according to the twelfth aspect is configured so that the second locking member includes an additional receiving surface contactable with the holding member to receive a biasing force from the biasing element. The receiving surface is in contact with the holding member in the locking orientation of the second locking member. The additional receiving surface is in contact with the holding member in the unlocking orientation of the second locking member.

With the wheel securing assembly in accordance with the thirteenth aspect, it is possible to make it easier to hold the second locking member in each of the locking orientation and the unlocking orientation.

In accordance with a fourteenth aspect of the present invention, the wheel securing assembly according to the thirteenth aspect is configured so that the second locking member is pivotable relative to the securing axle about a second pivot axis to be in each of the locking orientation and the unlocking orientation. A third maximum distance defined between the second pivot axis and the additional receiving surface is longer than a minimum distance defined between the second pivot axis and the receiving surface in the unlocking orientation of the second locking member when viewed along the second pivot axis.

With the wheel securing assembly in accordance with the fourteenth aspect, it is possible to make it more difficult to unintentionally change the orientation of the second locking member from the locking orientation to the unlocking orientation via the intermediate position. Thus it is possible to more effectively restrict the wheel securing assembly from being unintentionally detached from the bicycle body.

In accordance with a fifteenth aspect of the present invention, the wheel securing assembly according to the thirteenth or fourteenth aspect is configured so that the holding member includes a holding surface contactable with the additional receiving surface of the second locking member. The additional receiving surface of the second locking member includes a first curved surface. The holding surface of the holding member includes a second curved surface contactable with the first curved surface.

With the wheel securing assembly in accordance with the fifteenth aspect, it is possible to smoothly change the orientation of the second locking member from the unlocking orientation to the locking orientation.

In accordance with a sixteenth aspect of the present invention, the wheel securing assembly according to the fifteenth aspect is configured so that the first curved surface has a curved convex shape. The second curved surface has a curved concave shape.

With the wheel securing assembly in accordance with the sixteenth aspect, it is possible to more smoothly change the orientation of the second locking member from the unlocking orientation to the locking orientation.

In accordance with a seventeenth aspect of the present invention, the wheel securing assembly according to any one of the thirteenth to sixteenth aspects is configured so that the holding member is provided between the second locking member and the biasing element.

In accordance with an eighteenth aspect of the present invention, the wheel securing assembly according to any one of the thirteenth to seventeenth aspects is configured so that the securing axle includes an axle body extending between the first axle end and the second axle end along the center axis. The holding member includes an opening through which the second axle end extends. The biasing element is provided between the holding member and the axle body to bias the holding member toward the second locking member.

In accordance with a nineteenth aspect of the present invention, the wheel securing assembly according to any one of the first to eighteenth aspects is configured so that the second locking member includes an elongated hole extending along the receiving surface. The second locking structure includes a guide pin secured to the second axle end. The guide pin extends through the elongated hole to guide the second locking member relative to the securing axle.

With the wheel securing assembly in accordance with the nineteenth aspect, it is possible to realize the second securing structure with a simple construction.

In accordance with a twentieth aspect of the present invention, the wheel securing assembly according to any one of the first to nineteenth aspects is configured so that the second locking member includes a first part, a second part, and a third part. The first part includes a first elongated hole extending along the receiving surface. The second part is spaced apart from the first part. The second part includes a second elongated hole extending along the receiving surface. The third part couples the first part to the second part. The second locking structure includes a first guide pin and a second guide pin. The first guide pin is secured to the second axle end and extends through the first elongated hole to guide the second locking member relative to the securing axle. The second guide pin is secured to the second axle end and extends through the second elongated hole to guide the second locking member relative to the securing axle.

With the wheel securing assembly in accordance with the twentieth aspect, it is possible to realize the second securing structure with a simple construction.

In accordance with a twenty-first aspect of the present invention, the wheel securing assembly according to the twentieth aspect is configured so that the receiving surface is provided on at least one of the first part, the second part, and the third part.

With the wheel securing assembly in accordance with the twenty-first aspect, it is possible to stabilize a state in which the receiving surface is in contact with the bicycle body.

In accordance with a twenty-second aspect of the present invention, the wheel securing assembly according to any one of the first to twenty-first aspects is configured so that a maximum length of the second locking member is shorter than a maximum outer diameter of the securing axle when viewed along the center axis in a state where the second locking member is in the unlocking orientation relative to the securing axle.

With the wheel securing assembly in accordance with the twenty-second aspect, it is possible to more easily insert the second locking member into an opening of the bicycle body in the unlocking orientation.

In accordance with a twenty-third aspect of the present invention, the wheel securing assembly according to any one of the first to twenty-second aspects aspect is configured so that the second locking member includes a first end and a second end opposite to the first end. The first end is farther from the first locking structure than the second end in a state where the second locking member is in the unlock orientation. The first end includes at least one curved corner.

With the wheel securing assembly in accordance with the twenty-third aspect, it is possible to more easily insert the second locking member into an opening of the bicycle body in the unlocking orientation.

In accordance with a twenty-fourth aspect of the present invention, a bicycle wheel assembly comprises a bicycle hub assembly and the wheel securing assembly according to any one of the first to twenty-third aspects.

With the wheel securing assembly in accordance with the twenty-fourth aspect, it is possible to easily secure the bicycle hub assembly to the bicycle body via the wheel securing assembly.

In accordance with a twenty-fifth aspect of the present invention, the bicycle wheel assembly according to the twenty-fourth aspect further comprises a bicycle rim and spokes configured to couple the bicycle rim to the bicycle hub assembly.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

The embodiments will now be described with reference to the accompanying drawings, wherein like reference numerals designate corresponding or identical elements throughout the various drawings.

First Embodiment

Figure 1:
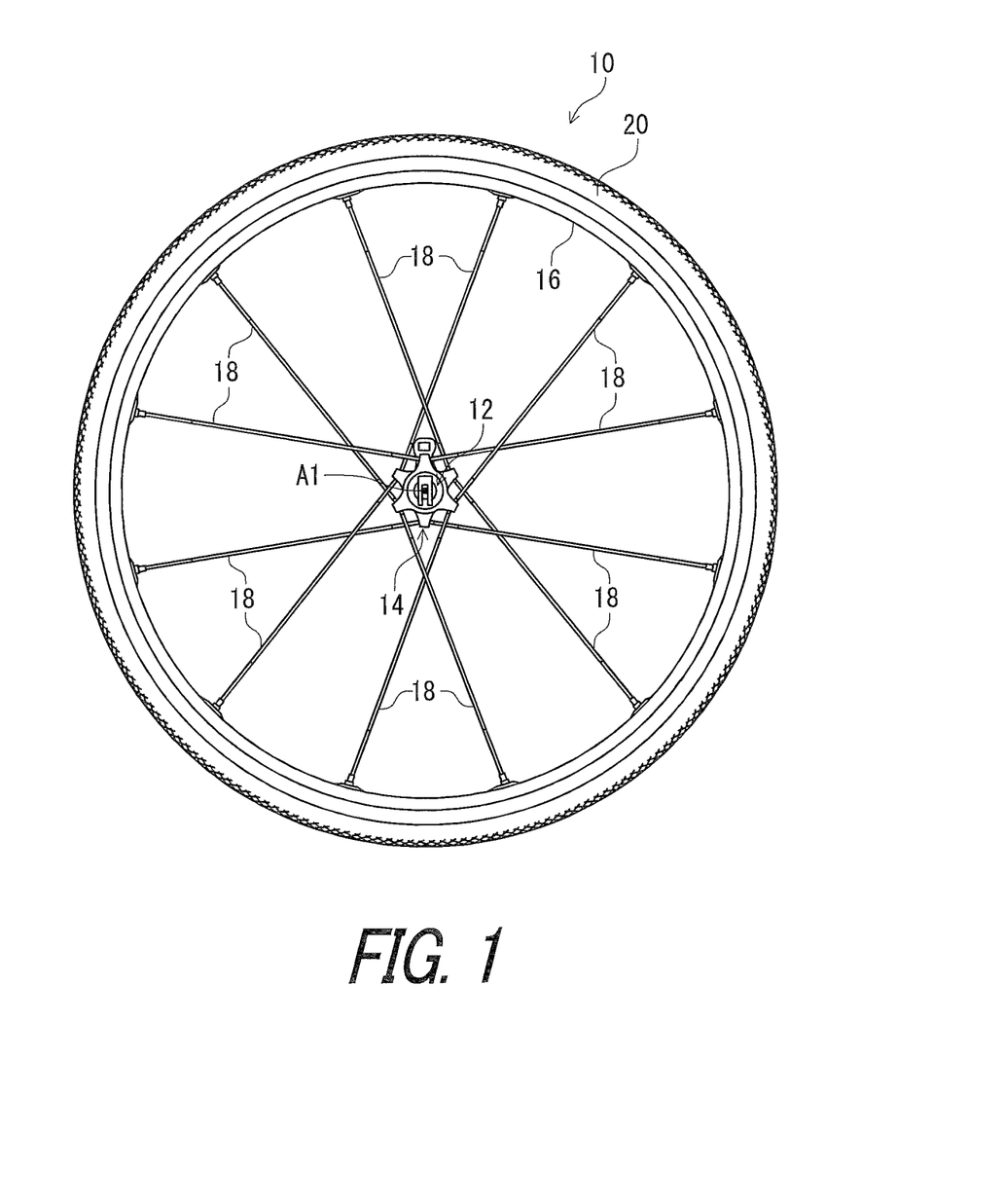
FIG. 1 is a side elevational view of a bicycle wheel assembly including a wheel securing assembly in accordance with a first embodiment.

Referring initially to FIG. 1, a bicycle wheel assembly 10 comprises a wheel securing assembly 12 in accordance with a first embodiment. The bicycle wheel assembly 10 further comprises a bicycle hub assembly 14, a bicycle rim 16, and spokes 18. A tire 20 is mounted to the bicycle rim 16. The spokes 18 are configured to couple the bicycle rim 16 to the bicycle hub assembly 14. The bicycle hub assembly 14 is secured to a bicycle body 2 (FIG. 2) via the wheel securing assembly 12. The bicycle hub assembly 14 is configured to rotatably support the bicycle rim 16 relative to the bicycle body 2 about a rotational axis A1.

Figure 2:
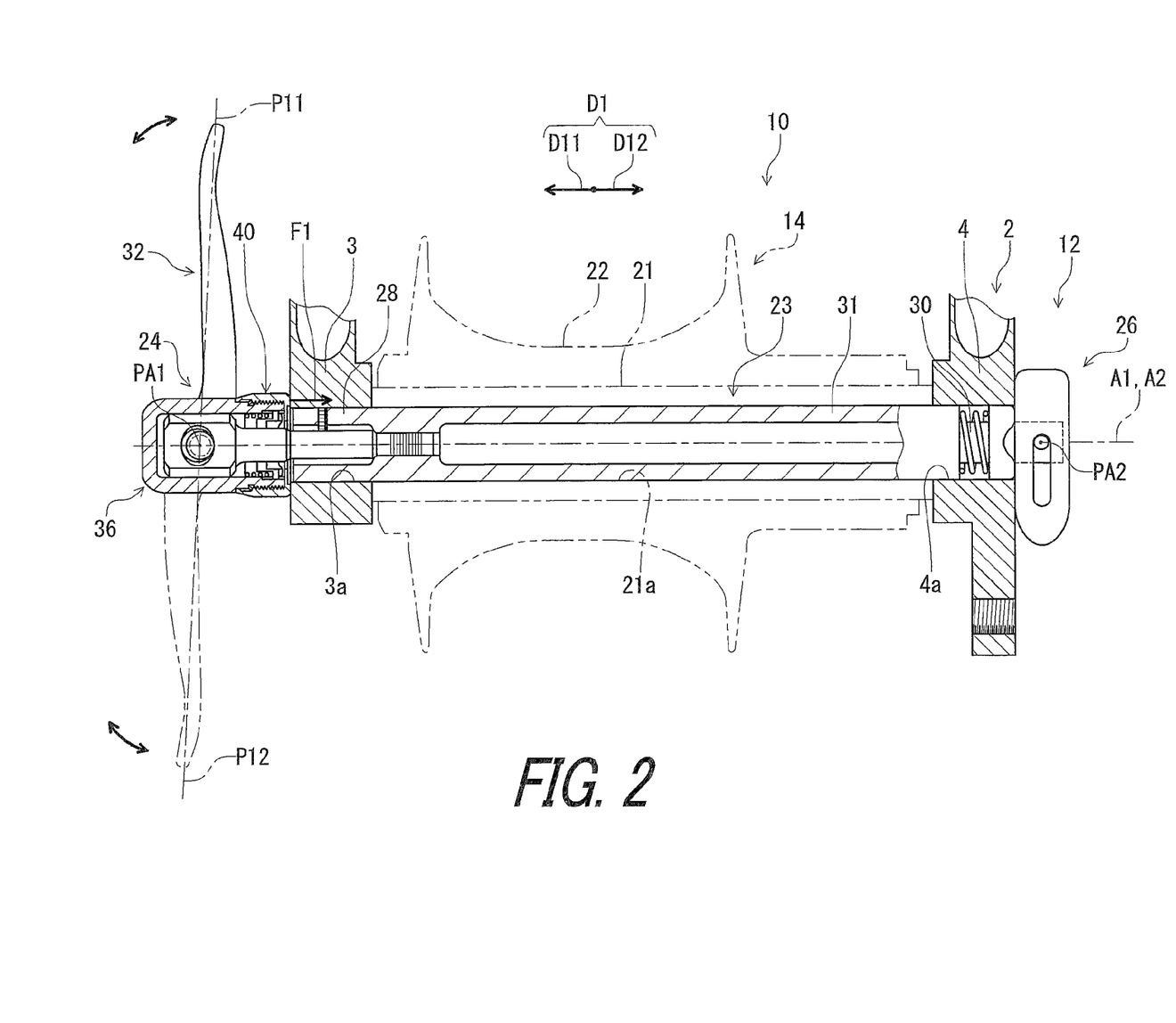
FIG. 2 is a partial cross-sectional view of the bicycle wheel assembly illustrated in FIG. 1.

As seen in FIG. 2, the bicycle hub assembly 14 includes a hub axle 21 and a hub shell 22. The hub axle 21 has a tubular shape and extends along the rotational axis A1. The hub shell 22 is rotatably mounted on the hub axle 21 about the rotational axis A1. The bicycle body 2 includes a first bicycle frame 3 and a second bicycle frame 4 spaced apart from the first bicycle frame 3. In the illustrated embodiment, for example, the first bicycle frame 3 and the second bicycle frame 4 are rear ends. However, the first bicycle frame 3 and the second bicycle frame 4 can be bicycle fork arms of a bicycle front fork of the bicycle body 2 if needed and/or desired. The hub axle 21 is detachably attached to the first bicycle frame 3 and the second bicycle frame 4 via the wheel securing assembly 12.

In the present application, the following directional terms "front", "rear", "forward", "rearward", "left", "right", "transverse", "upward" and "downward" as well as any other similar directional terms refer to those directions which are determined on the basis of a user (e.g., a rider) who sits on a saddle (not shown) of a bicycle with facing a handlebar (not shown). Accordingly, these terms, as utilized to describe the wheel securing assembly 12 of the bicycle wheel assembly 10, should be interpreted relative to the bicycle equipped with the bicycle wheel assembly 10 as used in an upright riding position on a horizontal surface.

As seen in FIG. 2, the wheel securing assembly 12 comprises a securing axle 23, a first locking structure 24, and a second locking structure 26. The securing axle 23 includes a center axis A2, a first axle end 28, and a second axle end 30. The second axle end 30 is opposite to the first axle end 28 along the center axis A2. The first locking structure 24 is configured to be provided at the first axle end 28. The second locking structure 26 is configured to be provided at the second axle end 30.

The securing axle 23 includes an axle body 31 extending between the first axle end 28 and the second axle end 30 along the center axis A2. The hub axle 21 includes a through-hole 21a. The securing axle 23 extends through the through-hole 21a in a securing state where the bicycle hub assembly 14 is secured to the bicycle body 2 via the wheel securing assembly 12. The center axis A2 of the securing axle 23 substantially coincides with the rotational axis A1 in the securing state where the bicycle hub assembly 14 is secured to the bicycle body 2 via the wheel securing assembly 12.

The first bicycle frame 3 includes a first securing opening 3a. The first axle end 28 is provided in the first securing opening 3a in the securing state where the bicycle hub assembly 14 is secured to the bicycle body 2 via the wheel securing assembly 12. The second bicycle frame 4 includes a second securing opening 4a. The second axle end 30 is provided in the second securing opening 4a in the securing state where the bicycle hub assembly 14 is secured to the bicycle body 2 via the wheel securing assembly 12.

Figure 3:
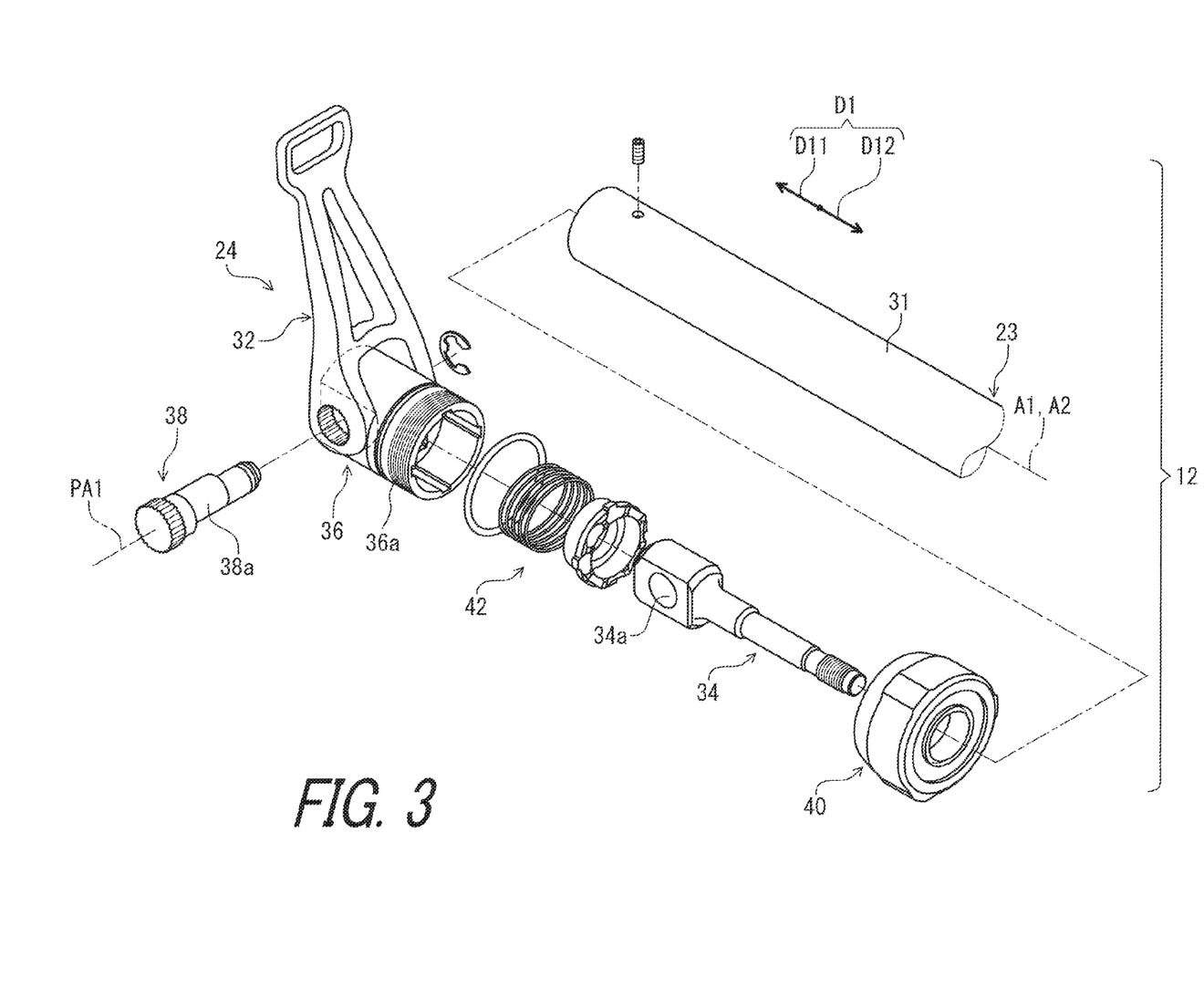
FIG. 3 is an exploded perspective view of the wheel securing assembly illustrated in FIG. 2.

As seen in FIG. 3, the first locking structure 24 includes a first locking member 32 that is configured to apply and release a securing force F1 to and from the bicycle body 2. The first locking member 32 is pivotable relative to the first axle end 28 about a first pivot axis PA1 to apply and release the securing force F1 to and from the bicycle body 2. The first pivot axis PA1 is non-parallel to the center axis A2. In the illustrated embodiment, the first pivot axis PA1 is defined to intersect with the center axis A2. Specifically, the first pivot axis PA1 is perpendicular to the center axis A2.

As seen in FIG. 3, the first locking structure 24 includes a coupling rod 34, a movable member 36, a pivot shaft 38, an adjustment member 40, and a positioning structure 42. The movable member 36 is movable relative to the securing axle 23 in an axial direction D1 parallel to the center axis A2 of the securing axle 23. Specifically, the coupling rod 34 is secured to the securing axle 23. The coupling rod 34 movably supports the movable member 36. The first locking member 32 is pivotable relative to the movable member 36 about the first pivot axis PA1. In the illustrated embodiment, the first locking member 32 is pivotably coupled to the movable member 36 via the pivot shaft 38. The pivot shaft 38 is coupled to the first locking member 32 to pivot together with the first locking member 32 relative to the movable member 36 about the first pivot axis PA1.

Figure 4:
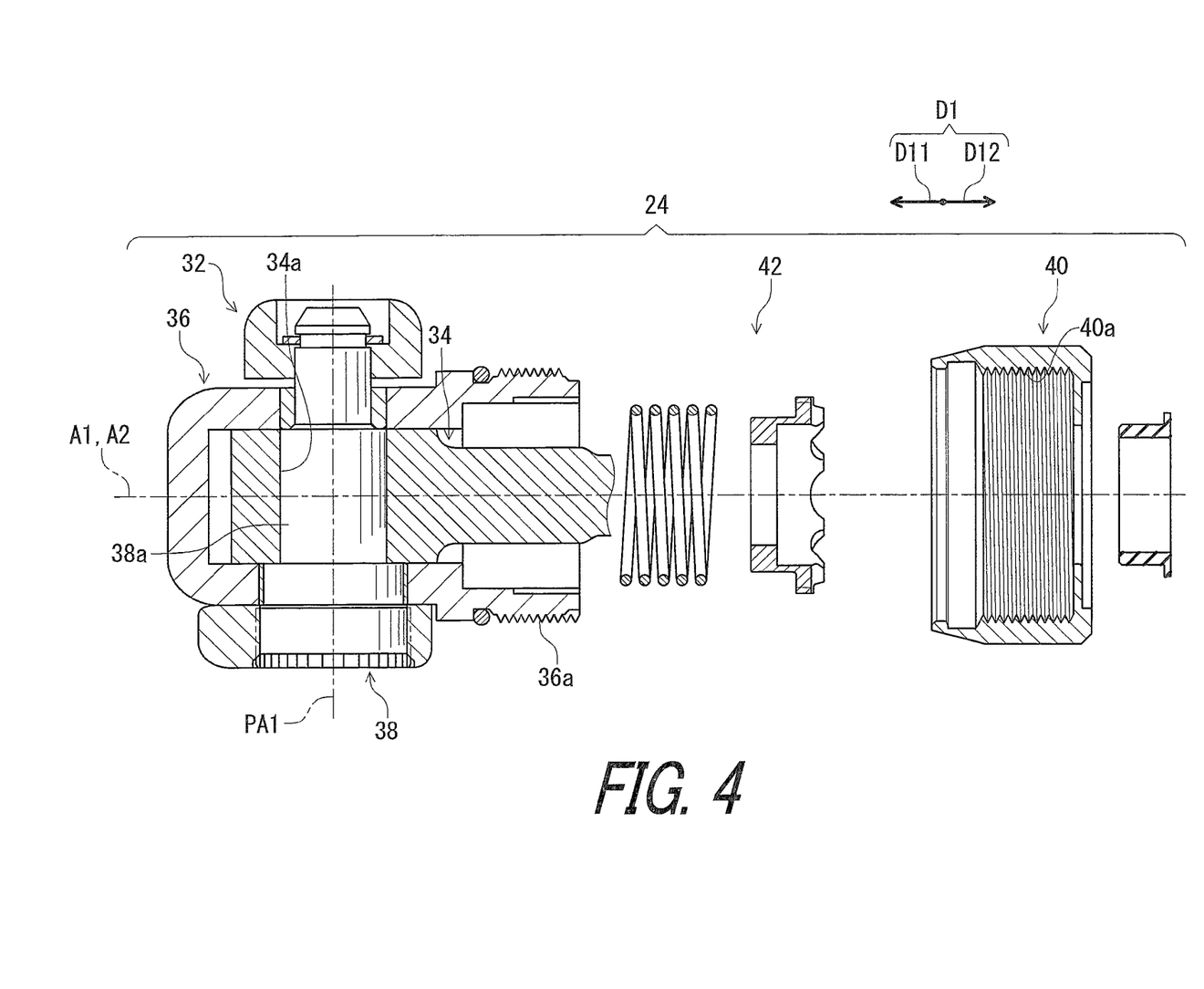
FIG. 4 is a partial exploded cross-sectional view of the wheel securing assembly illustrated in FIG. 2.

As seen in FIG. 4, the coupling rod 34 includes a cam hole 34a. The pivot shaft 38 extends through the cam hole 34a. The pivot shaft 38 includes a cam portion 38a provided in the cam hole 34a and is configured to move the securing axle 23 (FIG. 3) relative to the movable member 36 in the axial direction D1 in response to a pivotal movement of the first locking member 32.

Specifically, as seen in FIG. 2, the first locking member 32 is pivotable relative to the movable member 36 about the first pivot axis PA1 between a securing position P11 and a release position P12. The securing axle 23 is moved relative to the movable member 36 in a first axial direction D11 in response to a pivotal movement of the first locking member 32 from the release position P12 to the securing position P11. The securing axle 23 is moved relative to the movable member 36 in a second axial direction D12 in response to a pivotal movement of the first locking member 32 from the securing position P11 to the release position P12.

As seen in FIG. 4, the adjustment member 40 is movable relative to the movable member 36 in the axial direction D1. The adjustment member 40 is contactable with the first bicycle frame 3 of the bicycle body 2 (FIG. 2). In the illustrated embodiment, the adjustment member 40 has a threaded hole 40a. The movable member 36 has external threads 36a engaged with the threaded hole 40a. The external threads 36a and the threaded hole 40a are configured to convert a rotation of the adjustment member 40 relative to the movable member 36 into a movement of the adjustment member 40 relative to the movable member 36 in the axial direction D1. The positioning structure 42 is configured to selectively position the adjustment member 40 relative to the movable member 36 at a plurality of rotational positions.

Figure 5:
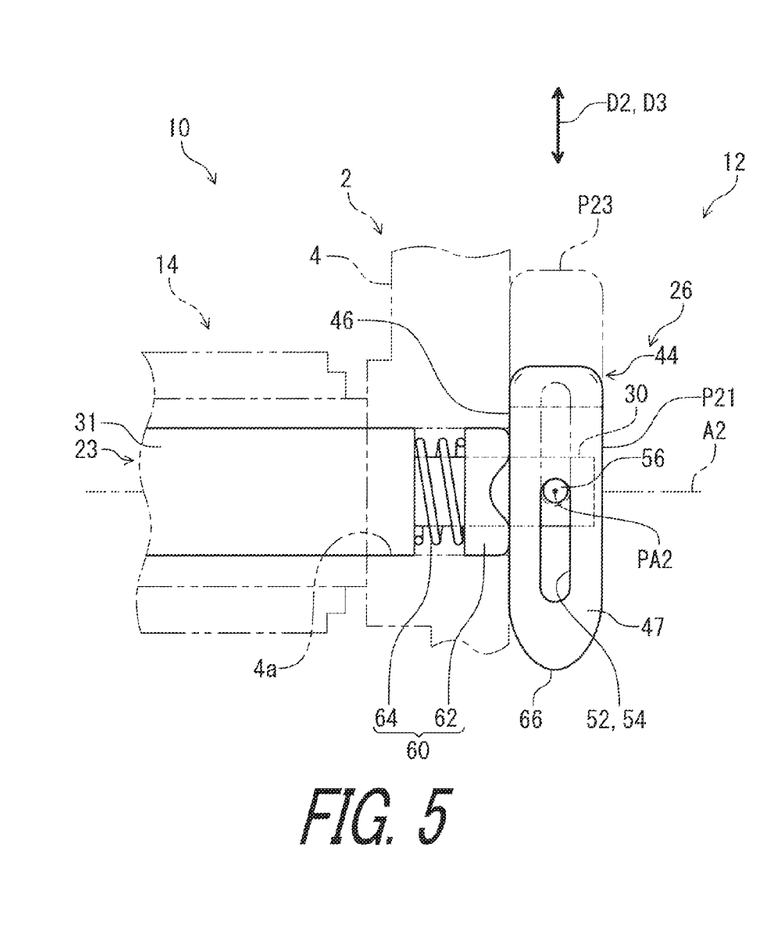
FIG. 5 is a partial rear elevational view of the wheel securing assembly illustrated in FIG. 2 (locking orientation)

As seen in FIGS. 5 to 8, the second locking structure 26 includes a second locking member 44 movable relative to the second axle end 30 to be in each of a locking orientation (FIG. 5) and an unlocking orientation (FIG. 7) different from the locking orientation. The second locking member 44 includes a receiving surface 46 contactable with the bicycle body 2 to receive the securing force F1 (FIG. 2). The second locking member 44 is contactable with the second bicycle frame 4 of the bicycle body 2 (FIG. 2). Specifically, the receiving surface 46 of the second locking member 44 is contactable with the second bicycle frame 4 of the bicycle body 2 in a state where the second locking member 44 is in the locking orientation (FIG. 5).

As seen in FIG. 5, the receiving surface 46 is positioned relative to the securing axle 23 to face in the axial direction D1 parallel to the center axis A2 in the locking orientation of the second locking member 44.

Figure 7:
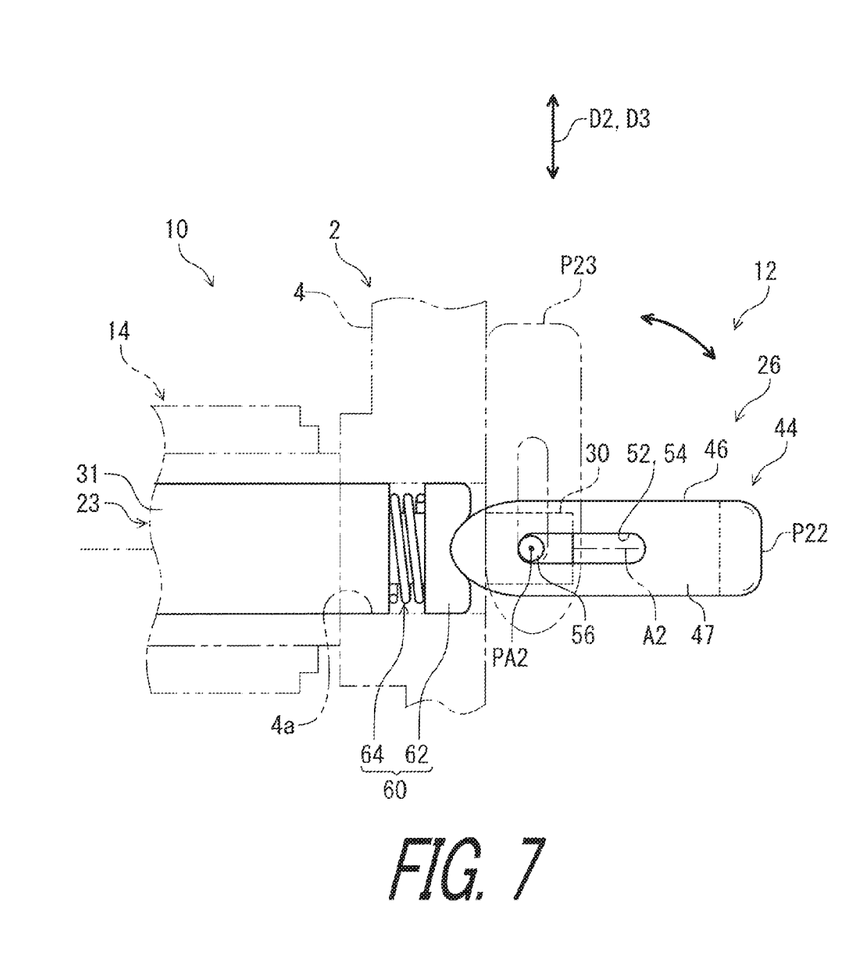
FIG. 7 is a partial rear elevational view of the wheel securing assembly illustrated in FIG. 2 (unlocking orientation)

As seen in FIG. 7, the receiving surface 46 is configured to face in a direction that is different from the axial direction D1 in the unlocking orientation of the second locking member 44. In the illustrated embodiment, the receiving surface 46 is configured to face in a radial direction D2 perpendicular to the center axis A2 in the unlocking orientation of the second locking member 44. In other words, the receiving surface 46 is substantially parallel to the axial direction D1 in the unlocking orientation of the second locking member 44. In the unlocking orientation, the second locking member 44 can be inserted into each of the first securing opening 3a (FIG. 2) and the second securing opening 4a. However, the receiving surface 46 can be configured to face in a direction that is different from each of the axial direction D1 and the radial direction D2 in the unlocking orientation of the second locking member 44.

As seen in FIGS. 5 and 7, the second locking member 44 is pivotable relative to the securing axle 23 about a second pivot axis PA2 to be in each of the locking orientation and the unlocking orientation. In the illustrated embodiment, the second pivot axis PA2 is defined to intersect with the center axis A2.

As seen in FIG. 5, the second locking member 44 is configured to be positioned relative to the securing axle 23 at a locking position P21 in the locking orientation. As seen in FIG. 7, the second locking member 44 is configured to be positioned relative to the securing axle 23 at an unlocking position P22 in the unlocking orientation. The unlocking position P22 is different from the locking position P21.

As seen in FIG. 5, the second locking member 44 is movable relative to the securing axle 23 between the locking position P21 and an intermediate position P23 with maintaining the locking orientation relative to the securing axle 23. The intermediate position P23 is different from the locking position P21 and the unlocking position P22. In the illustrated embodiment, the second locking member 44 is movable relative to the securing axle 23 in a movement direction D3 between the locking position P21 and the intermediate position P23 with maintaining the locking orientation relative to the securing axle 23. The movement direction D3 is perpendicular to the second pivot axis PA2. The movement direction D3 is parallel to the radial direction D2.

As seen in FIG. 7, the second locking member 44 is pivotable relative to the securing axle 23 about the second pivot axis PA2 between the intermediate position P23 and the unlocking position P22 with changing an orientation of the second locking member 44 between the locking orientation and the unlocking orientation.

Figure 6:
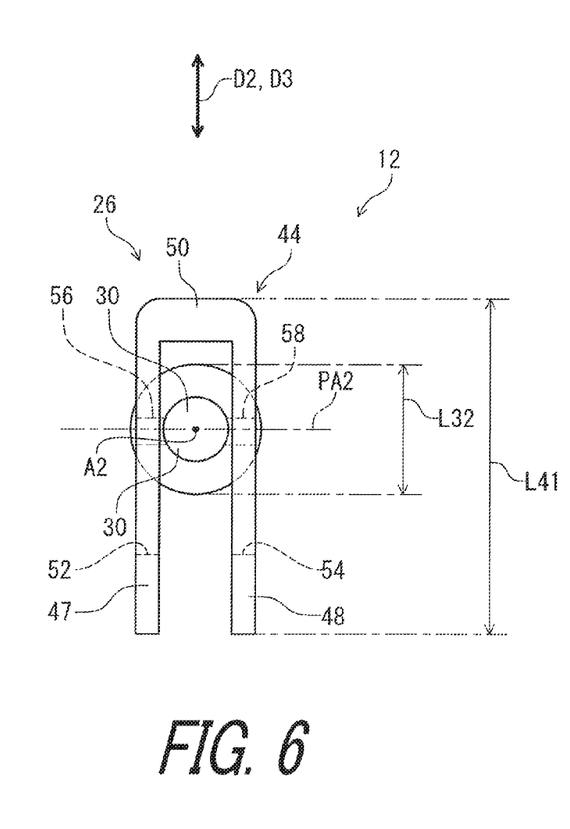
FIG. 6 is a partial side elevational view of the wheel securing assembly illustrated in FIG. 2 (locking orientation)

As seen in FIG. 6, the second locking member 44 includes a first part 47, a second part 48, and a third part 50. The second part 48 is spaced apart from the first part 47. The third part 50 couples the first part 47 to the second part 48. The receiving surface 46 is provided on at least one of the first part 47, the second part 48, and the third part 50. The second axle end 30 is provided between the first part 47 and the second part 48. In the illustrated embodiment, as seen in FIG. 8, the receiving surface 46 is provided on the first part 47, the second part 48, and the third part 50.

As seen in FIGS. 5 to 8, the second locking member 44 includes an elongated hole extending along the receiving surface 46. The second locking structure 26 includes a guide pin secured to the second axle end 30. The guide pin extends through the elongated hole to guide the second locking member 44 relative to the securing axle 23.

Figure 8:
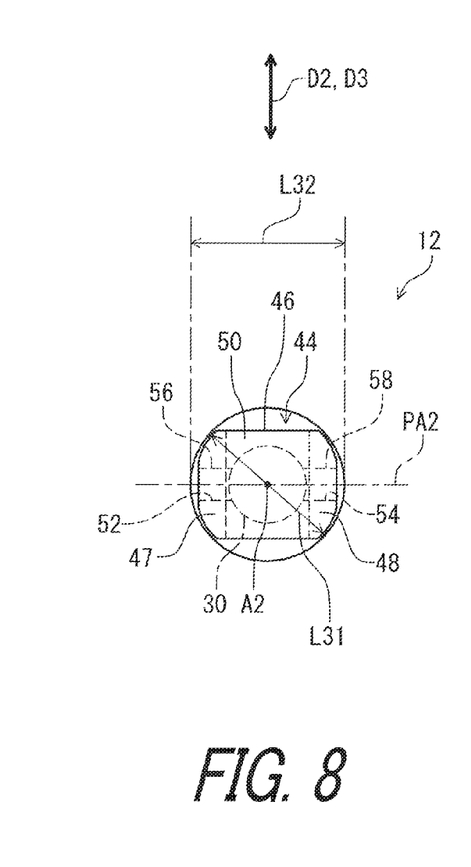
FIG. 8 is a partial side elevational view of the wheel securing assembly illustrated in FIG. 2 (unlocking orientation)

In the illustrated embodiment, as seen in FIGS. 6 and 8, the first part 47 includes a first elongated hole 52 extending along the receiving surface 46. The second part 48 includes a second elongated hole 54 extending along the receiving surface 46. The second locking structure 26 includes a first guide pin 56 and a second guide pin 58. The first guide pin 56 is secured to the second axle end 30 and extends through the first elongated hole 52 to guide the second locking member 44 relative to the securing axle 23. The second guide pin 58 is secured to the second axle end 30 and extends through the second elongated hole 54 to guide the second locking member 44 relative to the securing axle 23.

As seen in FIGS. 5 and 7, the second locking structure 26 includes a holding structure 60 configured to hold the second locking member 44 to be in at least one of the locking orientation and the unlocking orientation. In the illustrated embodiment, the holding structure 60 is configured to hold the second locking member 44 to be in both of the locking orientation and the unlocking orientation. However, the holding structure 60 can be configured to hold the second locking member 44 to be in one of the locking orientation and the unlocking orientation.

Figure 9:
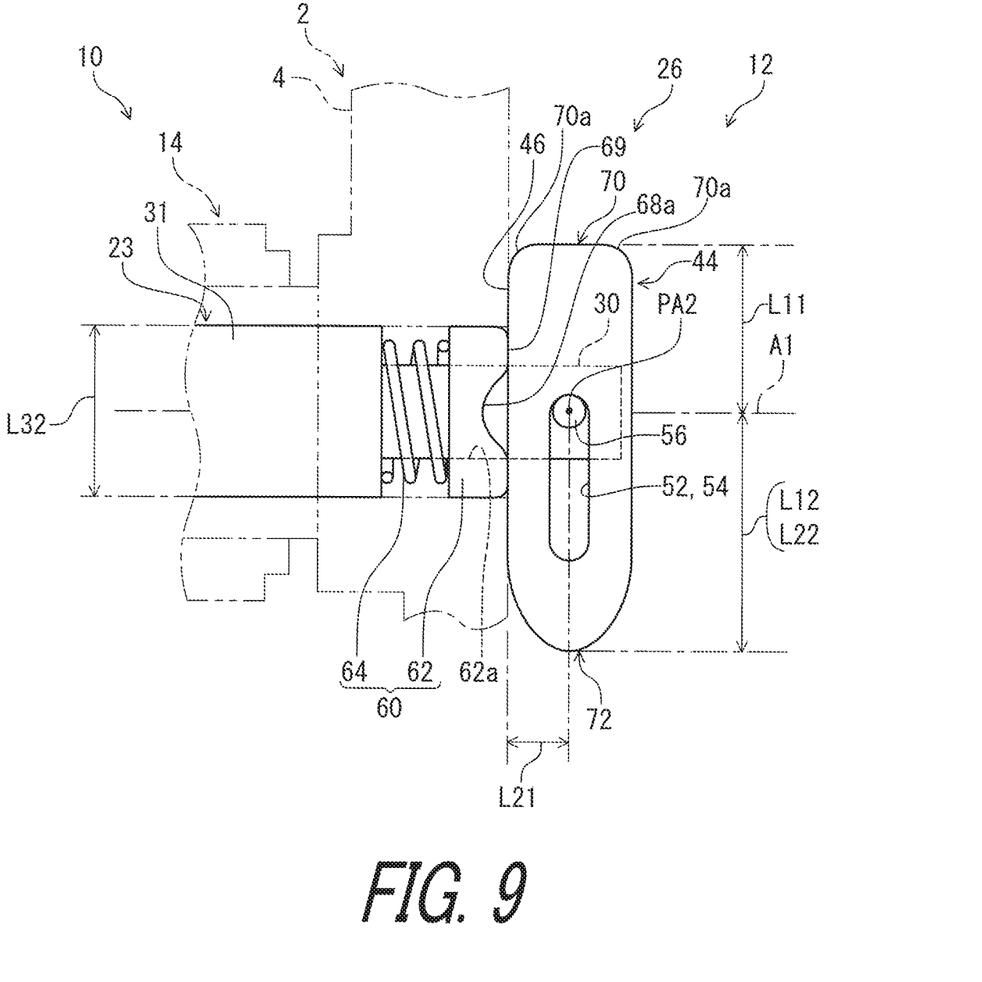
FIG. 9 is a partial enlarged rear elevational view of the wheel securing assembly illustrated in FIG. 2 (locking orientation)
Figure 10:
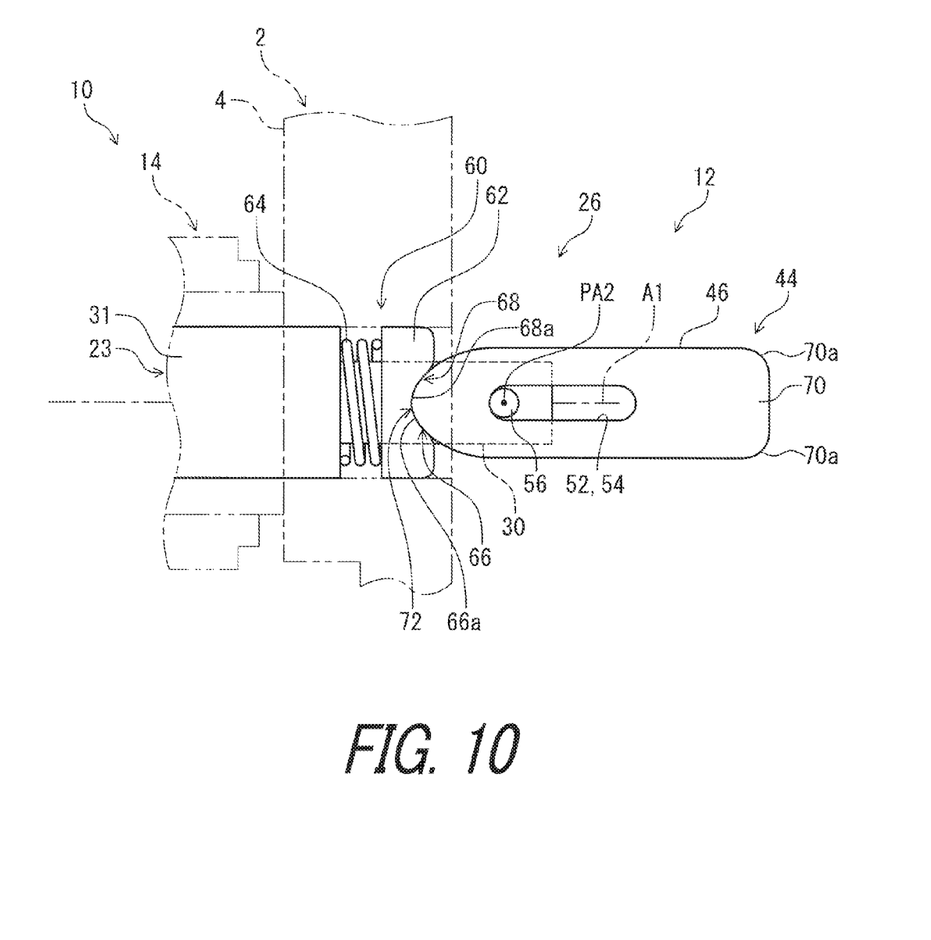
FIG. 10 is a partial enlarged rear elevational view of the wheel securing assembly illustrated in FIG. 2 (unlocking orientation)

As seen in FIGS. 9 and 10, the holding structure 60 includes a holding member 62 and a biasing element 64. The holding member 62 is movably mounted to the second axle end 30 along the center axis A2. The biasing element 64 is configured to bias the holding member 62 toward the second locking member 44.

The holding member 62 is provided between the second locking member 44 and the biasing element 64. The holding member 62 includes an opening 62a through which the second axle end 30 extends. The biasing element 64 is provided between the holding member 62 and the axle body 31 to bias the holding member 62 toward the second locking member 44. The receiving surface 46 is in contact with the holding member 62 in the locking orientation of the second locking member 44.

As seen in FIG. 10, the second locking member 44 includes an additional receiving surface 66 contactable with the holding member 62 to receive a biasing force from the biasing element 64. The additional receiving surface 66 is in contact with the holding member 62 in the unlocking orientation of the second locking member 44.

The holding member 62 includes a holding surface 68 contactable with the additional receiving surface 66 of the second locking member 44. The holding surface 68 is in contact with the additional receiving surface 66 in the unlocking orientation of the second locking member 44. The additional receiving surface 66 of the second locking member 44 includes a first curved surface 66a. The holding surface 68 of the holding member 62 includes a second curved surface 68a contactable with the first curved surface 66a. In the illustrated embodiment, the first curved surface 66a has a curved convex shape. The second curved surface 68a has a curved concave shape.

As seen in FIG. 9, the holding member 62 is contactable with the receiving surface 46. Specifically, the holding member 62 includes an additional holding surface 69 contactable with the receiving surface 46. The additional holding surface 69 is in contact with the receiving surface 46 in the locking orientation of the second locking member 44.

As seen in FIGS. 9 and 10, the second locking member 44 includes a first end 70 and a second end 72 opposite to the first end 70. In the illustrated embodiment, the additional receiving surface 66 is provided on the second end 72. As seen in FIG. 10, the first end 70 is farther from the first locking structure 24 than the second end 72 in a state where the second locking member 44 is in the unlock orientation. The first end 70 includes at least one curved corner. In the illustrated embodiment, the first end 70 includes two curved corners 70a when viewed along the second pivot axis PA2.

As seen in FIG. 9, a second maximum distance L12 defined between the second pivot axis PA2 and the second end 72 in the movement direction D3 is longer than a first maximum distance L11 defined between the second pivot axis PA2 and the first end 70 in the movement direction D3 in a state where the second locking member 44 is positioned at the locking position P21.

A third maximum distance L22 defined between the second pivot axis PA2 and the additional receiving surface 66 is longer than a minimum distance L21 defined between the second pivot axis PA2 and the receiving surface 46 in the unlocking orientation of the second locking member 44 when viewed along the second pivot axis PA2. In the illustrated embodiment, the maximum distance L22 is equal to the maximum distance L12.

As seen in FIG. 8, a maximum length L31 of the second locking member 44 is shorter than a maximum outer diameter L32 of the securing axle 23 when viewed along the center axis A2 in a state where the second locking member 44 is in the unlocking orientation relative to the securing axle 23. The second axle end 30 has an outer diameter smaller than an outer diameter of the axle body 31.

As seen in FIG. 6, a maximum length L41 of the second locking member 44 is longer than the maximum outer diameter L32 of the securing axle 23 when viewed in the axial direction D1 in a state where the second locking member 44 is in the locking orientation relative to the securing axle 23.

The second locking member 44 is in the unlocking orientation (FIG. 7) when the bicycle hub assembly 14 is secured to the bicycle body 2 via the wheel securing assembly 12. In this state, the second locking member 44 and the securing axle 23 are inserted into the first securing opening 3a and the second securing opening 4a of the bicycle body 2 (FIG. 2).

As seen in FIGS. 5 and 7, the second locking member 44 is pivoted relative to the securing axle 23 about the second pivot axis PA2 from the unlocking orientation (the unlocking position P22) to the locking orientation (the intermediate position P23). At this time, the holding member 62 is moved relative to the securing axle 23 toward the second locking member 44 by the biasing force from the biasing element 64. Thus, the additional holding surface 69 comes into contact with the receiving surface 46 of the second locking member 44, allowing the second locking member 44 to be easily held in the locking orientation relative to the securing axle 23.

As seen in FIG. 5, the second locking member 44 is moved relative to the securing axle 23 in the movement direction D3 from the intermediate position P23 to the locking position P21. In this state, as seen in FIG. 2, the adjustment member 40 is rotated relative to the movable member 36 until the adjustment member 40 comes into contact with the first bicycle frame 3. The first locking member 32 is pivoted relative to the movable member 36 from the release position P12 to the securing position P11, moving the securing axle 23 relative to the movable member 36 in the first axial direction D11. Thus, the first bicycle frame 3, the hub axle 21, and the second bicycle frame 4 are sandwiched between the adjustment member 40 and the second locking member 44 in the axial direction D1. Since the procedure opposite to the above procedure applies to the detachment of the wheel securing assembly 12, it will not be described in detail here for the sake of brevity.

It is possible to obtain the following advantageous effects with the wheel securing assembly 12 and the bicycle wheel assembly 10.

(1) With the wheel securing assembly 12, the receiving surface 46 is positioned relative to the securing axle 23 to face in an axial direction D1 parallel to the center axis A1 in the locking orientation of the second locking member 44. The receiving surface 46 is configured to face in a direction that is different from the axial direction D1 in the unlocking orientation of the second locking member 44. Accordingly, it is possible to easily attach and detach the wheel securing assembly 12 to and from the bicycle body 2 with maintaining the securing function of the wheel securing assembly 12.

(2) The first locking member 32 is pivotable relative to the first axle end 28 about a first pivot axis PA1 to apply and release the securing force F1 to and from the bicycle body 2, and the first pivot axis PA1 is non-parallel to the center axis A1. Accordingly, it is possible to attach and detach the wheel securing assembly 12 to and from the bicycle body 2 in response to a pivotal movement of the first locking member 32.

(3) The receiving surface 46 is configured to face in a radial direction D2 perpendicular to the center axis A1 in the unlocking orientation of the second locking member 44. Accordingly, it is possible to more easily attach and detach the wheel securing assembly 12 to and from the bicycle body 2.

(4) The second locking member 44 is pivotable relative to the securing axle 23 about a second pivot axis PA2 to be in each of the locking orientation and the unlocking orientation. Accordingly, it is possible to easily change an orientation of the second locking member 44 between the locking orientation and the unlocking orientation relative to the securing axle 23 using a pivotal movement of the second locking member 44.

(5) The second pivot axis PA2 is defined to intersect with the center axis A1. Accordingly, it is possible to more easily insert the second locking member 44 into an opening of the bicycle body 2 in the unlocking orientation.

(6) The second locking member 44 is movable relative to the securing axle 23 in a movement direction D3 between the locking position P21 and the intermediate position P23 with maintaining the locking orientation relative to the securing axle 23. Accordingly, it is possible to make it difficult to unintentionally change the orientation of the second locking member 44 from the locking orientation to the unlocking orientation via the intermediate position P23. Thus it is possible to restrict the wheel securing assembly 12 from being unintentionally detached from the bicycle body 2.

(7) Since the second maximum distance L12 is longer than the first maximum distance L11, it is possible to more effectively restrict the wheel securing assembly 12 from being unintentionally detached from the bicycle body 2.

(8) The second locking member 44 is pivotable relative to the securing axle 23 about the second pivot axis PA2 between the intermediate position P23 and the unlocking position P22 with changing an orientation of the second locking member 44 between the locking orientation and the unlocking orientation. Accordingly, it is possible to more effectively restrict the wheel securing assembly 12 from being unintentionally detached from the bicycle body 2.

(9) The second locking structure 26 includes a holding structure 60 configured to hold the second locking member 44 to be in at least one of the locking orientation and the unlocking orientation. Accordingly, it is possible to make it easier to insert the second locking member 44 into an opening of the bicycle body 2.

(10) Since the holding structure 60 includes the holding and the biasing element 64, it is possible to make it easier to insert the second locking member 44 into an opening of the bicycle body 2 with a simple structure.

(11) The receiving surface 46 is in contact with the holding member 62 in the locking orientation of the second locking member 44. The additional receiving surface 66 is in contact with the holding member 62 in the unlocking orientation of the second locking member 44. Accordingly, it is possible to make it easier to hold the second locking member 44 in each of the locking orientation and the unlocking orientation.

(12) Since the third maximum distance L22 is longer than the minimum distance L21, it is possible to make it more difficult to unintentionally change the orientation of the second locking member 44 from the locking orientation to the unlocking orientation via the intermediate position P23. Thus it is possible to more effectively restrict the wheel securing assembly 12 from being unintentionally detached from the bicycle body 2.

(13) The additional receiving surface 66 of the second locking member 44 includes the first curved surface 66a. The holding surface 68 of the holding member 62 includes the second curved surface 68a contactable with the first curved surface 66a. Accordingly, it is possible to smoothly change the orientation of the second locking member 44 from the unlocking orientation to the locking orientation.

(14) The first curved surface 66a has a curved convex shape. The second curved surface 68a has a curved concave shape. Accordingly, it is possible to more smoothly change the orientation of the second locking member 44 from the unlocking orientation to the locking orientation.

(15) The second locking member 44 includes the elongated hole 52 and/or 54 extending along the receiving surface 46. The second locking structure 26 includes the guide pin 56 and/or 58 secured to the second axle end 30. The guide pin 56 and/or 58 extends through the elongated hole to guide the second locking member 44 relative to the securing axle 23. Accordingly, it is possible to realize the second locking structure 26 with a simple construction.

(16) The second locking member 44 includes the first part 47, the second part 48, the third part 50, the first guide pin 56, and the second guide pin 58. Accordingly, it is possible to realize the second securing structure with a simple construction.

(17) The receiving surface 46 is provided on at least one of the first part 47, the second part 48, and the third part 50. Accordingly, it is possible to stabilize a state in which the receiving surface 46 is in contact with the bicycle body 2.

(18) Since the maximum length L41 of the second locking member 44 is shorter than the maximum outer diameter L32 of the securing axle 23 when viewed along the center axis A1 in a state where the second locking member 44 is in the unlocking orientation relative to the securing axle 23. Accordingly, it is possible to more easily insert the second locking member 44 into an opening of the bicycle body 2 in the unlocking orientation.

(19) Since the first end 70 includes at least one curved corner, it is possible to more easily insert the second locking member 44 into an opening of the bicycle body 2 in the unlocking orientation.

(20) With the bicycle wheel assembly 10, it is possible to easily secure the bicycle hub assembly 14 to the bicycle body 2 via the wheel securing assembly 12.

Second Embodiment

A bicycle wheel assembly 210 comprising a wheel securing assembly 212 in accordance with a second embodiment will be described below referring to FIGS. 11 and 12. The bicycle wheel assembly 210 has the same configuration as the bicycle wheel assembly 10 except for the second locking structure 26. Thus, elements having substantially the same function as those in the first embodiment will be numbered the same here, and will not be described and/or illustrated again in detail here for the sake of brevity.

Figure 11:
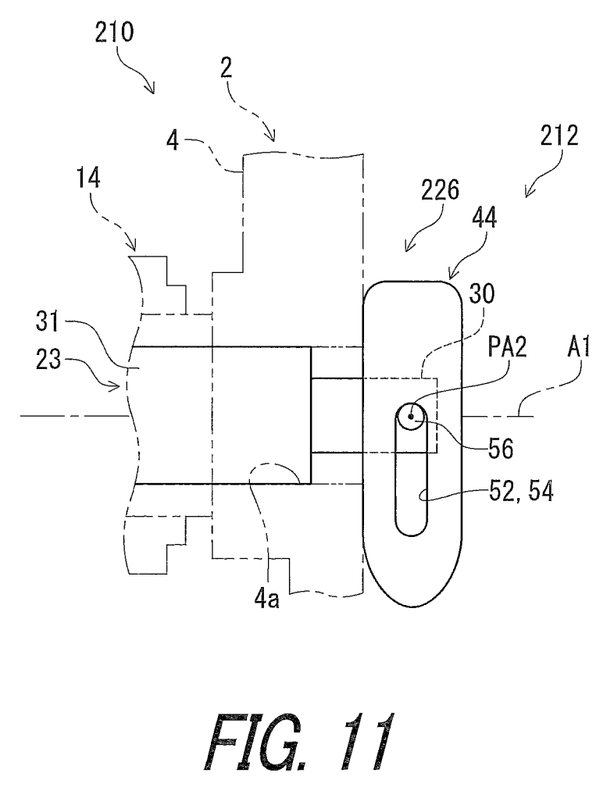
FIG. 11 is a partial enlarged rear elevational view of a bicycle wheel assembly including a wheel securing assembly in accordance with a second embodiment (locking orientation)
Figure 12:
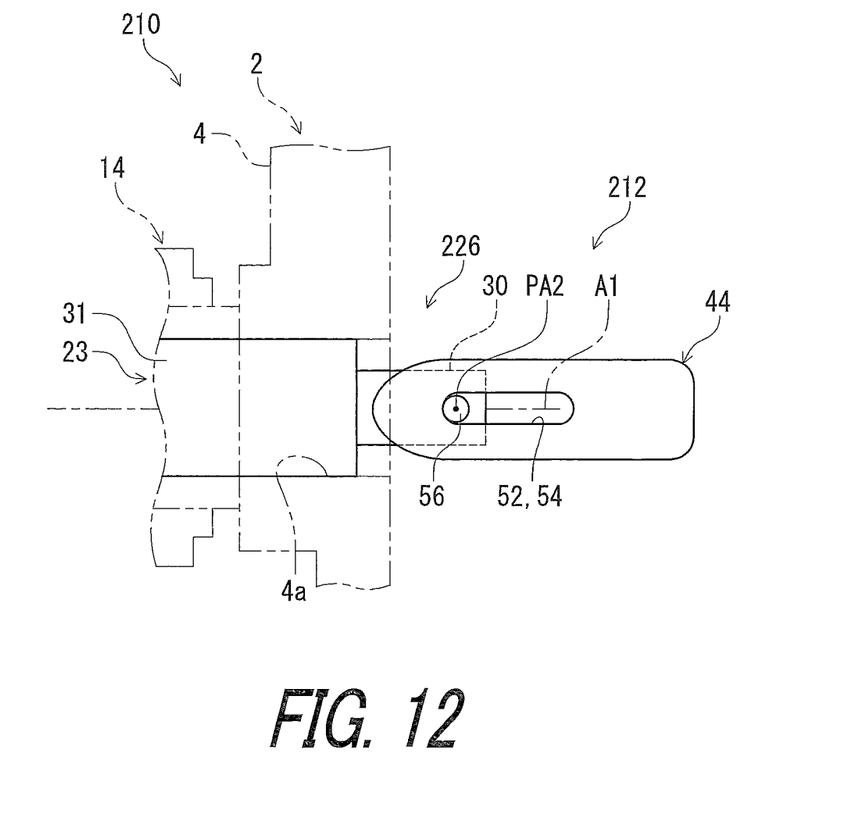
FIG. 12 is a partial enlarged rear elevational view of the wheel securing assembly illustrated in FIG. 11 (unlocking orientation).

As seen in FIGS. 11 and 12, the wheel securing assembly 212 comprises a second securing structure 226. The second securing structure 226 has substantially the same construction as that of the second locking structure 26 in the first embodiment except that the holding structure 60 is omitted.

With the wheel securing assembly 212, it is possible to obtain substantially the same advantageous effect as those of the wheel securing assembly 12 in accordance with the first embodiment.

With the bicycle wheel assembly 210, it is possible to obtain substantially the same advantageous effect as those of the bicycle wheel assembly 10 in accordance with the first embodiment.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part", "element", "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

The term "pair of", as used herein, can encompass the configuration in which the pair of elements have different shapes or structures from each other in addition to the configuration in which the pair of elements have the same shapes or structures as each other.

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A wheel securing assembly comprising:
a securing axle including a center axis, a first axle end, and a second axle end opposite to the first axle end along the center axis;
a first locking structure configured to be provided at the first axle end, the first locking structure including a first locking member that is configured to apply and release a securing force to and from a bicycle body; and
a second locking structure configured to be provided at the second axle end, the second locking structure including a second locking member movable relative to the second axle end to be in each of a locking orientation and an unlocking orientation different from the locking orientation, the second locking member including a receiving surface contactable with the bicycle body to receive the securing force, the receiving surface being positioned relative to the securing axle to face in an axial direction parallel to the center axis in the locking orientation of the second locking member, the receiving surface being configured to face in a direction that is different from the axial direction in the unlocking orientation of the second locking member.

2. The wheel securing assembly according to claim 1, wherein
the first locking member is pivotable relative to the first axle end about a first pivot axis to apply and release the securing force to and from the bicycle body, and the first pivot axis is non-parallel to the center axis.

3. The wheel securing assembly according to claim 1, wherein
the receiving surface is configured to face in a radial direction perpendicular to the center axis in the unlocking orientation of the second locking member.

4. The wheel securing assembly according to claim 1, wherein
the second locking member is pivotable relative to the securing axle about a second pivot axis to be in each of the locking orientation and the unlocking orientation.

5. The wheel securing assembly according to claim 4, wherein
the second pivot axis is defined to intersect with the center axis.

6. The wheel securing assembly according to claim 4, wherein
the second locking member is configured to be positioned relative to the securing axle at a locking position in the locking orientation, and
the second locking member is configured to be positioned relative to the securing axle at an unlocking position in the unlocking orientation, the unlocking position being different from the locking position.

7. The wheel securing assembly according to claim 6, wherein
the second locking member is movable relative to the securing axle between the locking position and an intermediate position with maintaining the locking orientation relative to the securing axle, and
the intermediate position is different from the locking position and the unlocking position.

8. The wheel securing assembly according to claim 7, wherein
the second locking member is movable relative to the securing axle in a movement direction between the locking position and the intermediate position with maintaining the locking orientation relative to the securing axle, and
the movement direction is perpendicular to the second pivot axis.

9. The wheel securing assembly according to claim 8, wherein
the second locking member includes a first end and a second end opposite to the first end, and
a second maximum distance defined between the second pivot axis and the second end in the movement direction is longer than a first maximum distance defined between the second pivot axis and the first end in the movement direction in a state where the second locking member is positioned at the locking position.

10. The wheel securing assembly according to claim 7, wherein
the second locking member is pivotable relative to the securing axle about the second pivot axis between the intermediate position and the unlocking position with changing an orientation of the second locking member between the locking orientation and the unlocking orientation.

11. The wheel securing assembly according to claim 1, wherein
the second locking structure includes a holding structure configured to hold the second locking member to be in at least one of the locking orientation and the unlocking orientation.

12. The wheel securing assembly according to claim 11, wherein
the holding structure includes
a holding member movably mounted to the second axle end along the center axis, and
a biasing element configured to bias the holding member toward the second locking member.

13. The wheel securing assembly according to claim 12, wherein
the second locking member includes an additional receiving surface contactable with the holding member to receive a biasing force from the biasing element, the receiving surface is in contact with the holding member in the locking orientation of the second locking member, and
the additional receiving surface is in contact with the holding member in the unlocking orientation of the second locking member.

14. The wheel securing assembly according to claim 13, wherein
the second locking member is pivotable relative to the securing axle about a second pivot axis to be in each of the locking orientation and the unlocking orientation, and
a third maximum distance defined between the second pivot axis and the additional receiving surface is longer than a minimum distance defined between the second pivot axis and the receiving surface in the unlocking orientation of the second locking member when viewed along the second pivot axis.

15. The wheel securing assembly according to claim 13, wherein
the holding member includes a holding surface contactable with the additional receiving surface of the second locking member,
the additional receiving surface of the second locking member includes a first curved surface, and
the holding surface of the holding member includes a second curved surface contactable with the first curved surface.

16. The wheel securing assembly according to claim 15, wherein
the first curved surface has a curved convex shape, and
the second curved surface has a curved concave shape.

17. The wheel securing assembly according to claim 13, wherein
the holding member is provided between the second locking member and the biasing element.

18. The wheel securing assembly according to claim 13, wherein
the securing axle includes an axle body extending between the first axle end and the second axle end along the center axis,
the holding member includes an opening through which the second axle end extends, and
the biasing element is provided between the holding member and the axle body to bias the holding member toward the second locking member.

19. The wheel securing assembly according to claim 1, wherein
the second locking member includes an elongated hole extending along the receiving surface,
the second locking structure includes a guide pin secured to the second axle end, and
the guide pin extends through the elongated hole to guide the second locking member relative to the securing axle.

20. The wheel securing assembly according to claim 1, wherein
the second locking member includes
a first part including a first elongated hole extending along the receiving surface,
a second part spaced apart from the first part, the second part including a second elongated hole extending along the receiving surface, and
a third part coupling the first part to the second part, and
the second locking structure includes a first guide pin secured to the second axle end and extending through the first elongated hole to guide the second locking member relative to the securing axle, and a second guide pin secured to the second axle end and extending through the second elongated hole to guide the second locking member relative to the securing axle.

21. The wheel securing assembly according to claim 20, wherein the receiving surface is provided on at least one of the first part, the second part, and the third part.

22. The wheel securing assembly according to claim 1, wherein a maximum length of the second locking member is shorter than a maximum outer diameter of the securing axle when viewed along the center axis in a state where the second locking member is in the unlocking orientation relative to the securing axle.

23. The wheel securing assembly according to claim 1, wherein the second locking member includes a first end and a second end opposite to the first end, the first end is farther from the first locking structure than the second end in a state where the second locking member is in the unlock orientation, and the first end includes at least one curved corner.

24. A bicycle wheel assembly comprising:

a bicycle hub assembly; and the wheel securing assembly according to claim 1.

25. The bicycle wheel assembly according to claim 24, further comprising:

a bicycle rim; and spokes configured to couple the bicycle rim to the bicycle hub assembly.

* * * * *